June 6, 1967  T. A. JOHNSON  3,323,311
CONCRETE FRAME FOR IRRIGATION GATE
Filed Oct. 4, 1965  3 Sheets-Sheet 1

TED A. JOHNSON INVENTOR.

BY *George R. Nimmer*
ATTORNEY

TED A. JOHNSON INVENTOR.

BY George R Nimmer
ATTORNEY

United States Patent Office 3,323,311
Patented June 6, 1967

3,323,311
CONCRETE FRAME FOR IRRIGATION GATE
Ted A. Johnson, Holdrege, Nebr., assignor to The Central Nebraska Public Power and Irrigation District of Holdrege, Nebr.
Filed Oct. 4, 1965, Ser. No. 492,443
5 Claims. (Cl. 61—28)

This invention relates to frames for irrigation gates and in particular to a multi-panel reinforced concrete structure that is readily adapted for several types of specific irrigation requirements.

In the construction of irrigation ditches, lateral ditches are employed at stated intervals, through which water is taken from time to time from the main ditch. Gate-like valves are customarily employed to turnout or divert substreams from the main ditch and also to control water flow along the lateral ditches. Irrigation ditches are usually made through porous and sandy soil, and consequently it is necessary to provide a gate frame of such nature that the water will flow through the gate frame throat or central passageway without washing away the soil base around the gate frame. Usually the gate frame is a rather heavy and cumbersome structure that is difficult to seat properly in the irrigation ditch. The gate frame structures are especially cumbersome and weighty when a check valve system is incorporated into the frame to control backflow from the substreams into the main ditch, as for example during a torrential rain storm.

It is accordingly an object of the present invention to provide a multi-panel irrigation gate frame or turnout adapted for easily and quickly assembling in a desired location in an irrigation ditch and which may be disassembled, removed, and stored when no longer needed at the original site, or reinstalled at another site as needed.

It is another object of the invention to provide an improved construction for the gate frame to reduce loss of water between the banks of the ditch and the frame.

Another object of the present invention is to optionally provide a base construction for the gate frame that is adapted to serve as a water check.

Another object of the present invention is to provide a multipanel gate frame, the various panels so constructed that they will fit firmly and tightly with a minimum of auxiliary paraphernalia.

A still further object is to provide a device of this character of simple and practical construction, which is efficient and reliable in operation, relatively inexpensive to manufacture and otherwise versatilely adapted for the purposes to which intended.

Another object is to provide a gate frame of marked physical strength and dimensional stability so that the gate frame will function reliably under various weather, soil, and use conditions.

These together with other objects and advantages which will be come subsequently apparent reside in the details of construction, combination and arrangement of parts, and more fully hereinafter described and claimed, reference being had to the accompanying drawings forming a part hereof, wherein like numerals refer to like parts throughout, and in which:

Figure 1:
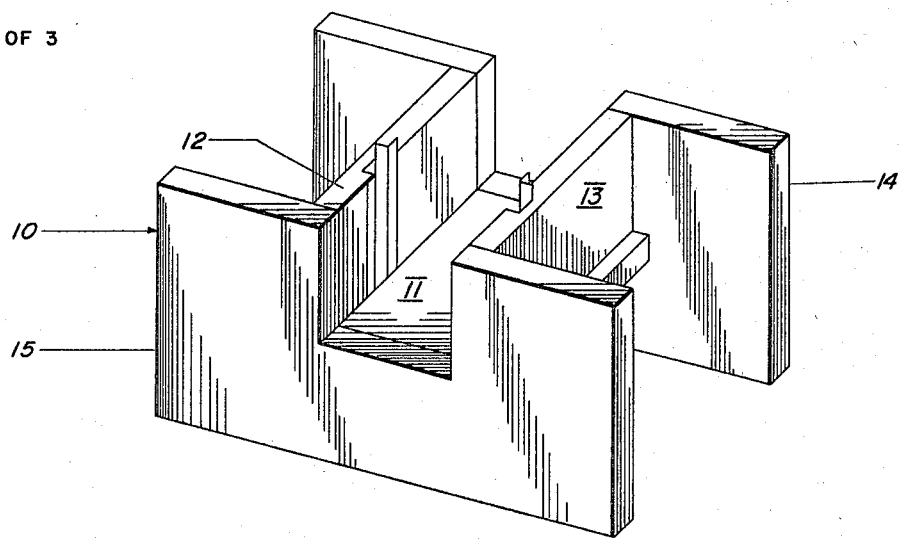
FIGURE 1 is a perspective view showing the irrigation gate frame of the present invention.
Figure 3:
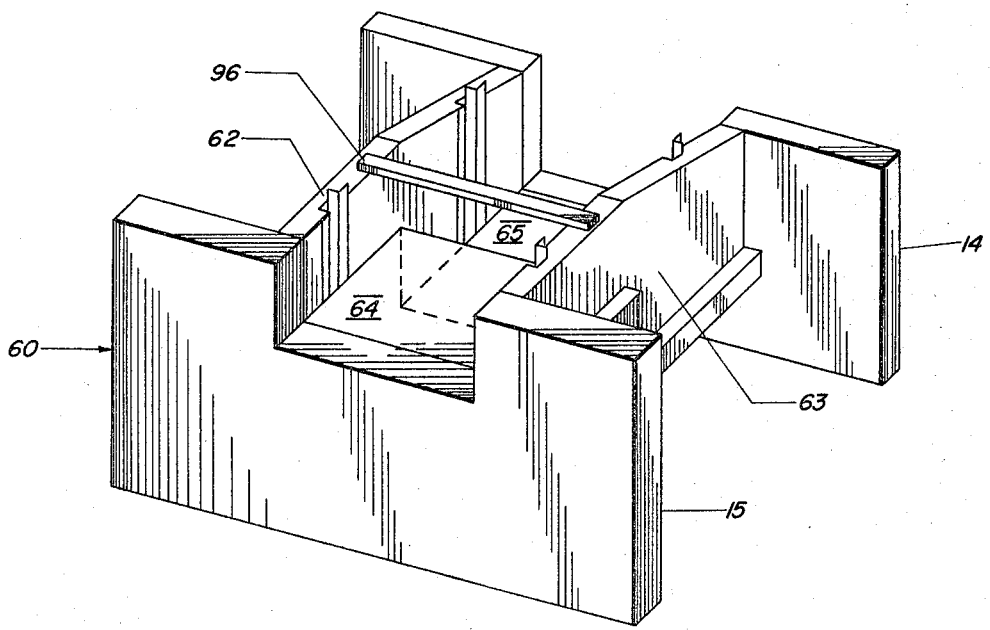
FIGURE 3 is a perspective view of another form of the irrigation gate frame having a stair-like base to provide a hydraulic pressure differential through the structure.
Figure 2:
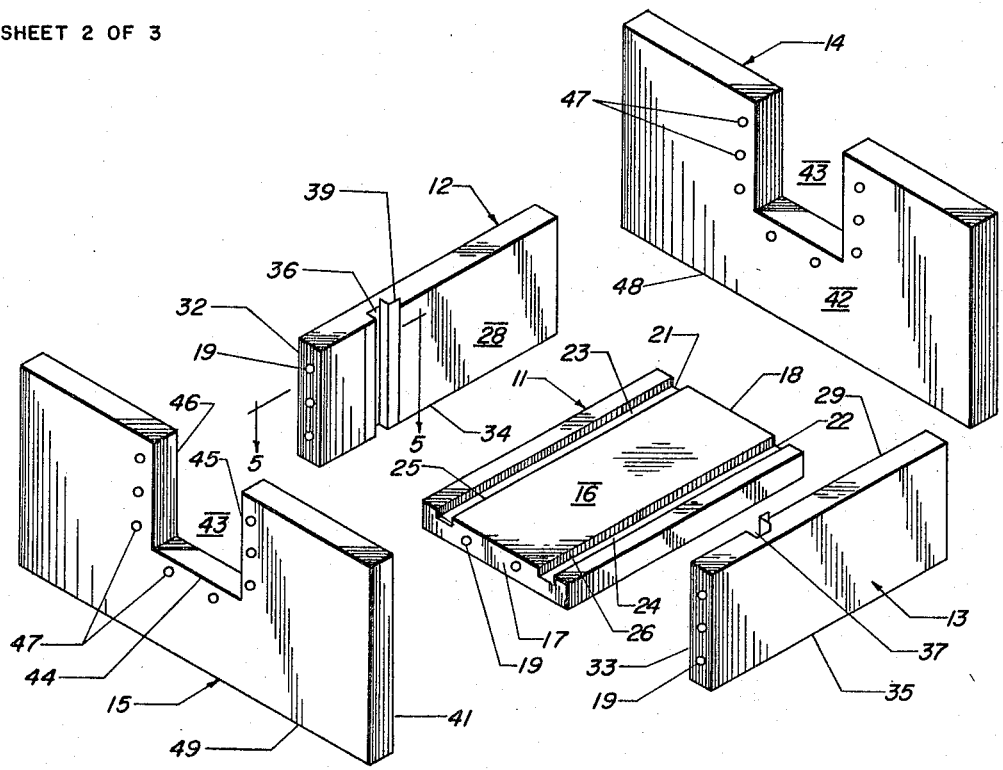
FIGURE 2 is an exploded view showing the several pre-cast concrete slab components of the irrigation gate frame of FIGURE 1.

That irrigation gate frame embodiment 10 shown in FIGURES 1 and 2 comprises a plurality of monolithic, precast, reinforced concrete panel members removably fastened together including a generally horizontal base member 11, a pair of upright side members 12 and 13, and a pair of standing wingwalls including a rearward wingwall 14 and a forward wingwall 15.

Base member 11 is of a generally rectangular slab-like configuration having a pair of parallel elongate planar surfaces including an upper planar horizontal surface 16. Base member 11 has a pair of parallel planar ends, including a forward end 17 and a rearward end 18, said ends 17 and 18 being vertically disposed with respect to upper surface 16. There is a pair of elongate parallel grooves 21 and 22 at the upper surface 16 of base member 11, the lengths of said grooves 21 and 22 being coextensive with the length of base member 11 e.g. the distance between ends 17 and 18. Grooves 21 and 22 each have a rectangular cross-sectional shape including horizontal planar bottoms 23 and 24, respectively, that are substantially perpendicular to ends 17 and 18 and parallel to upper surface 16. The sidewalls of grooves 21 and 22 are preferably planar as shown and also perpendicular to groove planar bottoms 23 and 24. The inward sidewalls 25 and 26 of grooves 21 and 22, respectively, are spaced substantially equal distances from either side of the base member central longitudinal axis.

Figure 6:
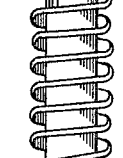
FIGURE 6 is a perspective view showing the anchor bolt employed for attaching the respective concrete slab components together.
Figure 4:
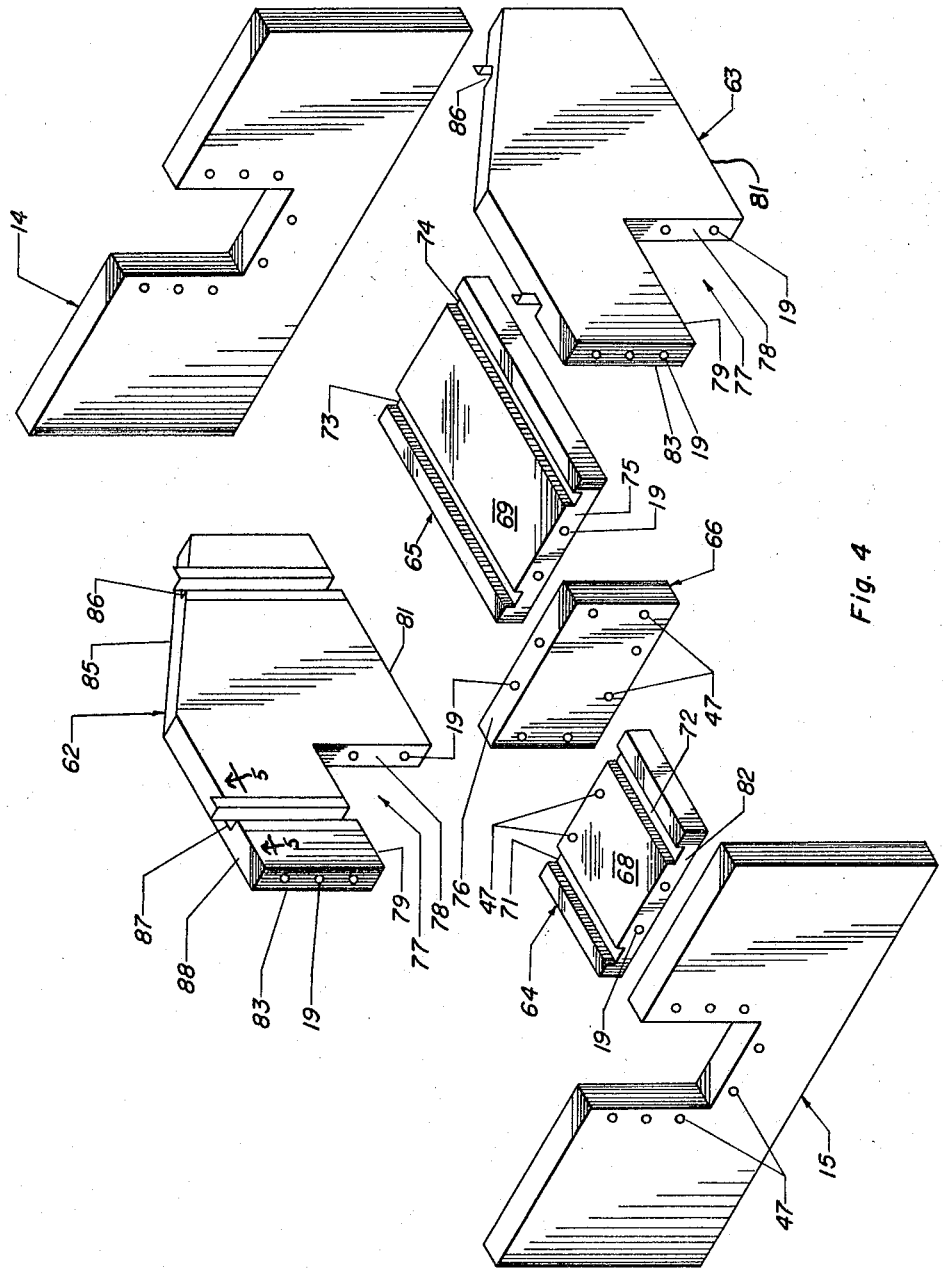
FIGURE 4 is an exploded view showing the several pre-cast concrete slab components of the irrigation gate frame of FIGURE 3.

As will be later explained in greater detail, the respective members are attached together with a plurality of the anchor bolts 20 shown in FIGURE 6, said anchor bolts 20 passing through wingwalls 14 and 15 into base member 11 and side members 12 and 13. During the concrete molding of base member 11 and side members 12 and 13, anchor bolts are placed within the mold, and later removed upon curing of the concrete, to provide end-wise threaded holes 19 in the base member ends e.g. 17, and in side member planar ends e.g. 32 and 33. Throughout this patent application, the numeral 19 refers to threaded holes in the concrete slabs or panels.

Side members 12 and 13 are each of a generally rectangular slab-like configuration having a pair of parallel elongate planar surfaces including inward planar vertical surfaces 28 and 29, respectively. Side members 12 and 13 are each essentially provided with planar ends for face-to-face abutment against wingwalls 14 and 15. Herein, side members 12 and 13 have parallel planar ends including forward ends 32 and 33, respectively. The planar ends of side members 12 and 13 are each provided with a plurality of threaded holes 19 for accommodation of anchor bolts 20.

The lower elongate edges 34 and 35 of side members 12 and 13, respectively, are planar for face-to-face abutment against planar groove bottoms 23 and 24, respectively. Side members 12 and 13 uprightly stand upon base member 11, the lower portions thereof adjacent to lower edges 34 and 35 nestably resting within grooves 21 and 22, respectively. The thickness of each side member at its lower elongate edge i.e. 34 and 35, is substantially equal to the transverse width of its surrounding groove. Lower elongate edges 34 and 35 are coextensive with the lengths of grooves 21 and 22, respectively, and synonymously coextensive between base member planar ends 17 and 18.

Figure 5:
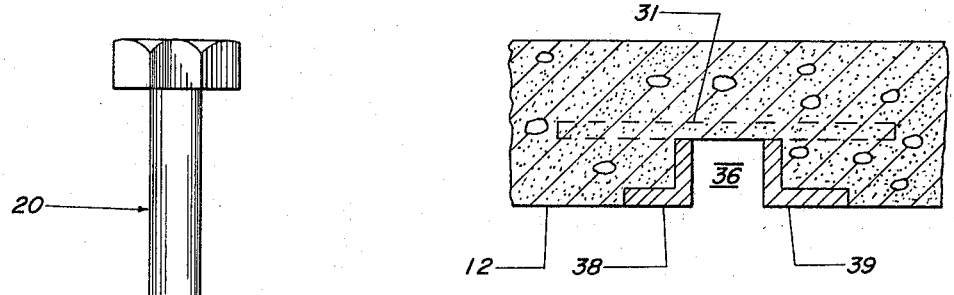
FIGURE 5 is a sectional view taken along lines 5—5 of FIGURES 2 and 4 to show the gate guide portion of the irrigation gate frame of the present invention.

There is a vertically disposed groove at the respective interior surfaces of side members 12 and 13. Specifically, side member 12 is provided with grooved portion 36 while side member 13 is provided with grooved portion 37. In order that a vertically slidable rectangular gate may be slidably engaged within grooved portions 36 and 37 in conventional fashion, there is a sheath-like shield provided at the surface. Grooves 36 and 37 are equidistant from a base panel end e.g. 17, so as to slidably accommodate a slab-type gate (not shown). As can best be seen in the FIGURE 5 sectional view, each shield plate structure comprises a pair of angle irons 38 and 39 each being welded to one or more intervening spaced rods 31, said spacer rods being embedded into the side member mold before the concrete is actually poured and cured. One of the angle irons 39 is longer and extends upwardly beyond the side member 12 so that a conventional overhead gate raising mechanism may be attached thereto. Thus, the angle iron sheaths within grooved portions 36 and 37 provide slidable ways for conventional rectangular slidable rectangular gate structures.

Standing wingwalls 14 and 15 are of a generally rectangular slab-like configuration, each having a pair of parallel elongate planar surfaces including inward planar surfaces for face-to-face abutment against the planar ends of base member 11 and side members 12 and 13. Specifically, rearward wingwall 14 has a planar inward surface 42 and forward wingwall 15 has a planar inward surface 41. Each opposed wingwall has an upper notched portion 43 of generally rectangular cross-sectional shape, said notch having a planar bottom portion 44 and planar sidewalls 45 and 46. The distance between the sidewalls 45 and 46 of throat-like notch 43 is substantially equal to the transverse spacing of parallel side members 12 and 13. Preferably, the bottom 44 of throat 43 is coplanar with base member upper surface 16, and the sidewalls 45 and 46 are coplanar with side members inward surfaces 25 and 26, respectively, so that throat 43 is coextensive with the channel formed by side member 12 and 13 and base member 11. Each wingwall has a plurality of unthreaded perforations 47 adjacently disposed along the three sides of throat 43. Perforations 47 are provided by means of spikes placed within the concrete mold, and later removed after the concrete has cured. Throughout this patent application, the numeral 47 refers to unthreaded holes in the concrete panels or slabs. Wingwalls 14 and 15, the planar inward surfaces 42 and 41 of which abut the planar ends of base member 11 and side members 12 and 13, are attached to said intervening base and side members with threaded anchor bolts 20 passing through perforations 47 and penetrating into threaded performations 19. Wingwalls 14 and 15 are equally dimensioned and conterminous, including parallel opposed bottom edges 48 and 49, respectively, to provide a horizontal supper for base member 11 which in turn vertically supports side members 12 and 13.

Owing to the face-to-face abutment of side member lower surfaces 34 and 35 against base member groove surfaces 23 and 24, and the abutment of wingwall inward surfaces 41 and 42 against the planar ends of base member 11 and side members 12 and 13, water may flow from notch-like throat 43 of forward wingwall 15, through the channel formed by side member 12 and 13 and base member 11, and thence outwardly through throat 43 of rearward wingwall 14 without appreciable leakage from the concrete irrigation turnout structure.

An alternate irrigation gate frame embodiment 60 has a stair-like base member 61, a pair of notched side members 62 and 63, and a pair of standing wingwalls including a rearward wingwall 14 and a forward wingwall 15. The stair-like base member 61 of embodiment 60 will provide a hydraulic pressure differential between wingwalls 14 and 15 to facilitate water flow from the main irrigation line to the several farms and will also provide a "check" to prevent back-up from the farms to the main irrigation line in case of flooding. On the other hand, embodiment 10 is utilized primarily for intra-farm water turnouts or "laterals" as they are called in the art.

Base member 61 comprises two rectangular horizontal slabs 64 and 65 that are vertically offset with respect to each other and an intervening vertical dropwall 66. Horizontal slabs 64 and 65 are each very similar to previously described base member 11. The forward slab segment 64 is shorter than and vertically offset from the rearward and lower slab segment 65. Slab segment 64 has a pair of parallel grooves 71 and 72 that are similar to grooves 21 and 22, while slab segment 65 has a pair of parallel grooves 73 and 74, also similar to grooves 21 and 22. Moreover, groove 71 of segment 64 is in longitudinal alignment and of identical width with groove 73 of segment 65, while groove 72 of segment 64 is in longitudinal alignment and of identical width with groove 74 of segment 65. Upper planar surface 68 of segment 64 is substantially parallel to upper planar surface 69 of segment 65.

Intervening drop wall 66 has a pair of parallel rectangular elongate planar surfaces, the rearward elongate surface abutting the forward planar end 75 of lower segment 65. Drop wall 66 has a pair of planar parallel ends, the upper planar end 76 abutting the planar underside of segment 64. Segment 64 is attached to drop wall end 76 with anchor bolts 20 passing through holes 47 and into pre-threaded holes 19 of drop wall 66. Drop wall 66 is attached against forward planar end 75 of segment 65 with helical anchor bolts 20 passing through holes 47 and into pre-threaded holes 19 of segment 65.

Side members 62 and 63 are generally identical with side members 12 and 13 except that there is a notched lower forward portion 77. The vertical boundary 78 and the horizontal boundary 79 of notches 77 are mutually perpendicular and of planar configuration. Thus, the lower horizontal elongate edge of side members 62 and 63 comprises two offset segments including boundary 79 and planar lower elongate extremity 81. Lowest elongate extremities 81 of side members 61 and 62 nest within and are coextensive with grooves 73 and 74, while horizontal lower notch edges 79 of side members 61 and 62 nest within and are coextensive with grooves 71 and 72. The planar vertical notch boundaries 78 abut against drop wall 66, and composite base member 61 is attached to side members 62 and 63 with anchor bolts 20 passing through holes 47 in drop wall 66 and into pre-threaded holes 19 of side members 62 and 63.

The inward surfaces of side members 62 and 63 are identical to the inward surfaces of side members 12 and 13, except that there are a pair of vertically positioned gate guide grooves 86 and 87 in each side wall, one on either side of drop wall 66. Thus, provided grooves 86 and 87 of each side member are aligned, a vertical panel gate can be slidably engaged within each pair of opposed grooves and the pressure head can be readily controlled across the stair-like channel formed between base member 61 and side members 62 and 63.

The upper extremity of side members 62 and 63 includes a horizontal portion 88 and a downwardly truncate portion 85. Metal bar 96 is attached across the opposed truncate surfaces 85, for purposes of structural strength when large volumes of water are carried by gate frame 60.

Wingwalls 14 and 15 are attached to the intervening composite base member 61 and to side members 62 and 63 as in embodiment 10. For example, the inward surface of forward wingwall 15 abuts the planar forward end 82 of base segment 64 and also the forward ends 83 of side members 62 and 63. The respective wingwalls 14 and 15 are attached to the intervening base member 61 and the side members 62 and 63 with anchor bolts 20, for example, passing through holes 47 in wingwalls 14 and 15 and into pre-threaded holes 19 of the intervening base and side members.

Owing to the abutting planar relationship between the base member, the side members, and the wingwalls, there is little leakage at the juncture of these slab or panel-like members.

From the foregoing, the construction and operation of the concrete frame for irrigation gate will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

1. A frame for an irrigation gate comprising a plurality of monolithic panel members including:
   (A) A slab-like base member having an upper surface and a lower surface, said base member having a pair of planar ends, the base member being provided with a pair of generally horizontal elongate grooves disposed at the upper surface, the lengths of the generally horizontal base member grooves being coextensive between the base member planar ends, said base member elongate grooved portions including a substantially horizontal planar interior base and a pair of planar sidewalls for said grooves,
   (B) A pair of uprightly standing side members each having a slab-like configuration, each side member having a pair of elongate broad surfaces including an inward and an outward surface, a pair of planar ends, and an elongate lower planar edge, each side member inward surface being provided with a grooved portion that is substantially normal to the base member and to the elongate lower planar edge of the side member, the lower elongate planar edge of each side member nesting within a base member elongate groove, the thickness of each said side member at its lower edge being substantially equal to the width of the surrounding base member groove, and
   (C) A pair of opposed standing slab-like wingwalls each having a planar surface abutting the respective planar ends of said base member and said side members, each wingwall including an upper notched portion of rectangular cross-sectional shape, each notched portion including a base that is substantially coextensive with the spacing of the base member elongate grooves, each notched portion including a pair of upright sidewalls that are spaced apart a distance substantially equivalent to that of the side members spacing, said opposed wingwalls being removably attached to the base member and to the side members with fastener means passing through a respective wingwall and penetrating into the respective planar ends of the abutting base member and side members.

2. A frame for an irrigation gate comprising:
   (A) A horizontal base member having a generally rectangular slab-like configuration, said base member having a pair of horizontal parallel planar elongate surfaces, a pair of parallel elongate planar edges, and a pair of parallel planar ends, the base member being provided with a pair of elongate parallel grooves horizontally disposed at the upper surface, said base member grooves being parallel to the respective elongate planar edges, the dimensional spacing of the respective base member grooves from the base member longitudinal central axis being substantially equal, the interior bottoms of said base member grooves being parallel to the slab base upper surface, the interior sidewalls of said base member grooves being perpendicular to the slab base upper surface and to base planar ends,
   (B) A pair of upright parallel side members each having a generally rectangular slab-like configuration, each side member having a pair of vertical planar parallel elongate surfaces including inward and outward surfaces, the spacing of said elongate surfaces being equal to the spacing of the base member grooves sidewalls, a pair of parallel elongate planar edges, and a pair of parallel planar ends, each side member being provided with a vertical groove at the inward surface, said vertical grooves being perpendicular to an elongate edge of the side member and to the base member, said grooves being spaced an equal distance from a common planar end of the base member, the interior contour of said side member grooves being substantially identical, the interior contour of each side member groove being integrally provided with a metallic sheath reinforcing layer, the lower elongate planar edge of each side member resting within a base member groove, the lengths of said base member grooves and the lower elongate planar edge of the side members being substantially equal and coextensive so that the opposed parallel side members are coterminous, and
   (C) A pair of opposed upright parallel wingwalls, each having a planar surface abutting the respective ends of said base member and said side members each wingwall having a generally rectangular configuration and each having an upper notched portion of rectangular cross-sectional shape, the base of said notches being substantially equal dimensionally to the dimensional separation of said base member grooves, the base of said notch being coextensive along and coplanar with the base member upper surface portion between the base member grooves, the vertical sides of said notches being coextensive along and coplanar with the side members inward surfaces, said opposed wingwalls being attached to the intervening base member and side members with anchor bolts passing through the respective wingwalls into the respective ends of the abutting base member and side members.

3. A concrete frame for an irrigation gate comprising:
   (A) A horizontal base member having a slab-like configuration, said base member having a substantially planar upper elongate surface, a pair of elongate edges, and a pair of parallel planar ends, the base member being provided with a pair of parallel elongate grooves disposed at the upper surface, the lengths of said grooves being coextensive with the distance between the base member planar ends, said base member grooves including a planar interior bottom that is parallel with the base member upper surface and a pair of planar sidewalls,
   (B) A pair of upright parallel side members each having a slab-like configuration, each side member having a pair of elongate surfaces including an inward and an outward surface, a pair of planar ends and an elongate lower planar edge, each side member being provided with a groove at the inward surface, said inward surface groove being substantially perpendicular to the elongate lower planar edge of the side member, the lower elongate planar edge of each side member nesting within a base member groove, the lengths of said base member grooves and the longer elongate edge of the side members being coextensive so that the adjacently disposed parallel inward surfaces of the opposed side members are conterminous, and
   (C) A pair of upright slab-like wingwalls abutting the respective ends of said base member and said side members, each wingwall including an upper notched portion of rectangular cross-sectional shape, each notched portion including a base that is substantially equal dimensionally to the dimensional spacing of the base member grooves, the sidewalls of said notches being at least as close together dimensionally as the spacing of the adjacent side members interior surfaces, said opposed wingwalls being removably attached to the intervening base member and side members with helical fastener means passing through a respective wingwall and penetrating into the respective ends of the abutting base member and side members.

4. The concrete frame of claim 3 wherein the base member comprises two vertically offset segments, including forward and rearward segments, separated by an intervening upright dropwall, the upper surfaces of the two offset base segments being planar and parallel, the base member grooves being coextensive with the respective planar ends of the base member, each side member being provided with a pair of grooves at the inward surface, the forward end of the respective side members being notched at the lower edge, the vertical notch boundary being planar and abutting the intervening dropwall, the horizontal notch boundary nesting within the elongate groove of the upper segment of the base member.

5. A concrete frame for an irrigation gate comprising:
(A) A base member comprising two horizontal slab-like segments that are vertically offset with respect to each other and an intervening upright dropwall segment, said three segments being removably attached together with helical fastener means, the horizontal upper surface of the base member being provided with a pair of elongate grooves coextensive between the ends of the base member, said base member ends being of planar configuration,
(B) A pair of uprightly standing side members each having a slab-like configuration, each side member having a pair of elongate surfaces including an inward and an outward surface, a pair of planar ends, and an offset lower planar edge having two vertically offset segments, the lowest segment of the lower planar edge nesting within the grooved portion of the lowest base segment, the upper segment of the lower planar edge nesting within the grooved portion of the upper base segment, the thickness of each said side member at its lower edge being substantially equal to the width of the surrounding base member groove, each side member being provided with means to slidably support a vertical gate between the side members, and
(C) A pair of opposed standing slab-like wingwalls each having a planar surface abutting the respective planar ends of said base member and said side members, each wingwall including a central notched portion of the upper edge, said central notch being substantially coextensive with the distance between the side members, the base of said notch having a vertical elevation at least equal to that of the upper base segment, said opposed wingwalls being removably attached to the base member and to the side members with helical fastener means passing through a respective wingwall and threadedly engaged into the planar ends of the abutting base member and side members.

References Cited

UNITED STATES PATENTS

| | | | |
|---|---|---|---|
| 769,968 | 9/1904 | Warren | 61—28 |
| 2,042,350 | 5/1936 | McGuire | 61—28 |
| 2,694,292 | 11/1954 | Wing | 61—29 |
| 2,778,194 | 1/1957 | Van Leevwen | 61—28 |
| 3,287,918 | 11/1966 | Stewart | 61—28 |

REINALDO P. MACHADO, *Primary Examiner.*